United States Patent Office 3,346,601
Patented Oct. 10, 1967

3,346,601
PROCESS FOR THE MANUFACTURE OF
19-NOR-STEROIDS
Albert Wettstein, Riehen, Georg Anner, Karl Heusler, and Jaroslav Kalvoda, Basel, and Hellmut Ueberwasser, Riehen, Switzerland, assignors to Ciba Corporation, New York, N.Y., a corporation of Delaware
No Drawing. Filed Apr. 23, 1963, Ser. No. 274,949
Claims priority, application Switzerland, Apr. 28, 1962, 5,083/62
14 Claims. (Cl. 260—397.4)

The present invention provides a new process for the manufacture of 19-norsteroids starting from $\Delta^5$-steroid-19-acids.

The products of the present process are compounds having a pharmacological action or may be used as intermediates in the manufacture of such compounds. The present process is particularly suitable for the manufacture of the therapeutically important derivatives of 19-nortestosterone and 19-norprogesterone, for example of 17$\alpha$ - methyl-, 17$\alpha$-vinyl- or 17$\alpha$-ethinyl-19-nortestosterone, their esters and $\Delta^{5(10)}$-analogues, for example of $\Delta^{5(10)}$ - 3 - oxo - 17$\alpha$ - ethinyl- and -17$\alpha$-chlorethinyl-17$\beta$ - hydroxy - 19 - norandrostene, and also of - 17$\alpha$-acetoxy - 19 - norprogesterone, which are used as anabolic or progestative medicaments or as ovulation inhibitors.

All the above-mentioned compounds have hitherto been available only by reduction of steroid compounds containing an aromatic ring A, which themselves had to be produced from $\Delta^{1,4}$-3-ketosteroid dienes by thermal elimination of the angular 19-methyl group with simultaneous aromatization, or by microbiological hydroxylation of compounds unsubstituted in position 19, oxidation of the $\Delta^4$-3-oxo-19-hydroxy-steroids obtained to the $\Delta^4$-3-oxo-19-acids and decarboxylation.

The present invention is based on the observation that 19-norsteroids can be obtained in a simple manner by thermally decarboxylating $\Delta^5$-steroid-19-acids and, if desired, converting in known manner in the resulting $\Delta^{5(10)}$-19-norsteroids the oxygen functions present, all together or singly, into oxo or hydroxyl groups and, if desired, displacing the 5:10-double bond in a 3-oxo compound by treatment with an acid or base in 4:5-position and/or, if desired, esterifying any residual free hydroxyl groups.

The decarboxylation according to the invention is performed by heating the starting materials in a suitable high-boiling solvent, for example in an organic base such as lutidine, quinoline or quinaldine, or in decaline, dimethylformamide, anisol or the like. Particularly good yields of $\Delta^{5(10)}$-19-norsteroids are obtained by heating the starting materials to a temperature above their respective melting and decomposition point in a partial vacuum, without using a solvent. The end of the reaction is indicated by the cessation of the development of carbon dioxide. A preferred method of purifying the crude product is to take it up in one of the conventional organic solvents, for example in ether, benzene or methylene chloride, and removing any residual starting material from the solution by washing it with alkali.

The conversion of acyloxy groups in the $\Delta^{5(10)}$-19-norsteroids obtained by the present process into hydroxyl groups is advantageously performed by basic hydrolysis, for example by treatment with a bicarbonate, carbonate or hydroxide of an alkali metal, or reductively with the aid of a complex metal hydride of the type of lithium aluminum hydride. The conversion of any oxo groups present, for example of the 17-oxo group, into hydroxyl group is carried out, for example, by catalytic hydrogenation or by reaction with a compound of the type M—X, where X either represents a hydrogen atom [in which case M stands for LiAlH$_3$, NaBH$_3$, KBH$_3$ or the like] or a lower saturated or unsaturated hydrocarbon radical which may be substituted by a halogen atom, for example a methyl, ethyl, trifluorovinyl, allyl, ethinyl, chlorethinyl, bromethinyl, propinyl or trifluoropropinyl group, in which case M represents MgBr, MgI, MgCl or an alkali metal. When the reduction is performed under the aforementioned conditions the conversion of the oxo group is generally accompanied by conversion of any acyloxy groups present, for example in position 3, into hydroxyl groups.

The dehydrogenation of secondary hydroxyl groups formed by hydrolysis or reduction is carried out in known manner, for example with a compound of hexavalent chromium, such as chromium-VI-oxide, chromium-VI-oxide-pyridine complex and alkali metal salts of chromic acid, or with N-halogenamides or -imides, for example with N-bromacetamide, N-chloracetamide, N-bromosuccinimide or the like, or by the Oppenauer method.

The isomerization of the $\Delta^{5(10)}$-3-oxo-19-norsteroids to form $\Delta^4$-3-oxo compounds is preferably performed by treatment with organic or inorganic acids such as formic, acetic, propionic, para-toluenesulfonic, sulfuric, hydrochloric or perchloric acid, using for example a lower aliphatic carboxylic acid, a lower aliphatic alcohol, a ketone or a halogenated hydrocarbon as solvent. The isomerization can be performed with equal results with weak or strong bases, such as an acylate, bicarbonate, carbonate, hydroxide or alcoholate of an alkali metal, for example sodium or potassium acetate, sodium, potassium or lithium bicarbonate, carbonate or hydroxide, or sodium or potassium methylate or ethylate.

The present process is illustrated in the following diagram taking the $\Delta^5$ - 3-acetoxy-17-oxoandrostene-19-acid by way of example:

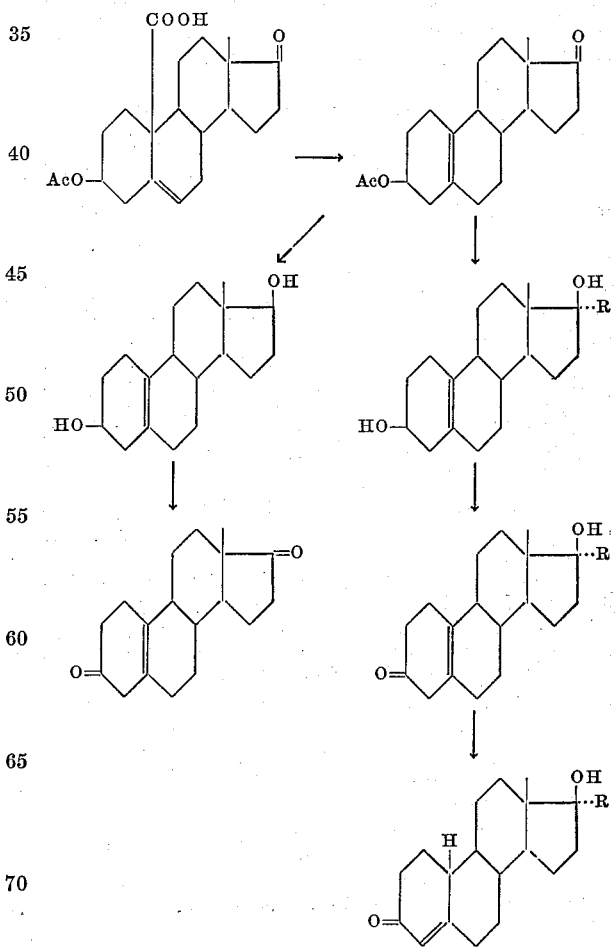

In these formulae R represents a saturated or unsaturated lower aliphatic hydrocarbon radical which may be halogenated.

Starting materials suitable for use in the present process are $\Delta^5$-steroid-19-acids, preferably those belonging to the pregnane, androstane, chloane, chloestane, spirostane or cardanolide series. These acids may contain further substituents in one or more than one of the positions 1, 4, 7, 8, 9, 11, 12, 14–17, 20 or 21 or in the side chain, for example alkyl (such as methyl) groups, halogen atoms, free or functionally converted hydroxyl or oxo groups such as esterified or etherified hydroxyl groups, ketalized or enolized oxo groups, more especially in one or more than one of the positions 15, 16, 17, 20 and 21. The starting materials may also contain further double bonds, more especially in ring D and in the side chain.

Particularly valuable starting materials for use in the present process are $\Delta^5$-steroid-19-acids of the androstane and pregnane series such as preferably contain oxygen functions in positions 3 and 17 or 20. Relevant examples are:

$\Delta^5$-3$\beta$-acyloxyandrostene-19-acids,
$\Delta^5$-17-hydroxyandrostene-19-acid and its 17-esters,
$\Delta^5$-17-oxoandrostene-19-acids,
$\Delta^5$-3:17-diacyloxyandrostene-19-acids, and
$\Delta^5$-3-acyloxy-17-oxoandrostene-19-acids; furthermore
$\Delta^5$-3:20-diacyloxypregnene-19-acids,
$\Delta^5$-3-acyloxy-20-oxopregnene-19-acids,
$\Delta^5$-20-oxopregnene-19-acids,
$\Delta^5$-3:21-diacyloxy-20-oxopregnene-19-acids,
$\Delta^5$-3:17-diacyloxy-20-oxopregnene-19-acids,
$\Delta^5$-3:17-diacyloxy-16-methyl-20-oxopregnene-19-acids, and the like.

Specific starting materials are the following $\Delta^5$-steroid-19-acids:

$\Delta^5$-3:17-diacetoxyandrostene-19-acid,
$\Delta^5$-3-acetoxy-17-oxoandrostene-19-acid,
$\Delta^5$-3:20-diacetoxypregnene-19-acid,
$\Delta^5$-3:17-diacetoxy-20-oxopregnene-19-acid, and
$\Delta^5$-3-acetoxy-20-oxopregnene-19-acid.

All the compounds mentioned above as suitable starting materials are advantageously prepared from the corresponding 19-unsubstituted steroids by the processes disclosed in copending applications Ser. No. 222,168, filed Sept. 7, 1962, by Albert Wettstein et al., now U.S. Patent No. 3,211,726, Ser. No. 122,654, filed July 10, 1961, now abandoned, by Albert Wettstein et al. and Ser. No. 122,655, filed July 10, 1961, by Albert Wettstein et al., now U.S. Patent No. 3,067,198. For example: 19-unsubstituted 5$\alpha$-halogeno-6-hydroxysteroids are treated, for instance, with lead tetraacetate and iodine, or with lead tetraacetate alone, in a non-polar solvent (cyclohexane or carbon tetrachloride), the resulting 6$\beta$:19-oxidosteroid is oxidized, for example with chromium trioxide in glacial acetic acid, to form the corresponding 6$\beta$:19-lactone of the 5$\alpha$-halogeno-6$\beta$-hydroxysteroid-19-acid which latter is then converted under reducing conditions, for example by treatment with zinc in glacial acetic acid, into the $\Delta^5$-steroid-19-acid.

Another aspect of the present invention are $\Delta^{5(10)}$-3-hydroxy-17-oxo-19-norandrostenes and $\Delta^{5(10)}$-3-hydroxy-20-oxo-19-norpregnenes and their esters, more especially $\Delta^{5(10)}$-3$\beta$-acetoxy-17-oxo-19-norandrostene and $\Delta^{5(10)}$-3$\beta$-acetoxy-20-oxo-19-norpregnene, which are valuable intermediates for the manufacture of the highly active 17-substituted derivatives of 19-nortestosterone and 19-norprogesterone and their $\Delta^{5(10)}$-analogues. Compared to other intermediates in the synthesis of the said physiologically active steroids such as the known 3:17-diketones or the 3:20-diketones, they offer an outstanding advantage with respect to the formation or introduction of other groups, e.g., the formation of a 17$\beta$-hydroxyl group or the introduction of an alkyl group in 17$\alpha$-position of an androstane compound, or the introduction of a hydroxy or acyloxy group in 17$\alpha$-position of a 20-oxo-pregnane compound; this advantage consists in the fact that the reactions employed for the introduction of such groups can be carried out directly without any modification of the group in 3-position as would be necessary in the case of the aforementioned diketones. Thus, for example, $\Delta^{5(10)}$-3$\beta$-acetoxy-17-oxo-19-norandrostene can be converted by reaction with methyl magnesium iodide, accompanied by hydrolysis of the acetoxy group, into the $\Delta^{5(10)}$-3$\beta$:17$\beta$-dihydroxy-17$\alpha$-methyl-19-norandrostene and the latter, by oxidation of the 3-hydroxyl group, for example with chromium trioxide-pyridine complex, or with chromium trioxide in acetone+sulfuric acid at 0° C., into the $\Delta^{5(10)}$-3-oxo-17$\alpha$-methyl-17$\beta$-hydroxy - 19 - norandrostene, or with isomerization of the double bond into the 19-nor-17$\alpha$-methyltestosterone.

The conversion of the $\Delta^{5(10)}$-3:17-dioxo-19-norandrostene—accessible from $\Delta^5$-3:17-diacetoxyandrostene-19-acid by the decarboxylation according to the invention, saponification of the two acetoxy groups, for example by heating with potassium hydroxide in an aqueous methanolic solution, followed by dehydrogenation—into derivatives displaying an androgenic, anabolic, progestative or ovulation-inhibiting effect of 19-nortestosterone or of its $\Delta^{5(10)}$-isomer may be carried out by the process disclosed in copending application Ser. No. 202,085, filed June 13, 1962, by Albert Wettstein et al., now U.S. Patent No. 3,178,456, according to which the starting material referred to above is treated with a lower aliphatic alcohol in the presence of an acidic catalyst, in the resulting $\Delta^{5(10)}$ - 3:3-dialkoxy-17-oxo-19-norandrostene the 17-oxo group is converted in known manner into a 17-hydroxyl group, the 3-ketal is hydrolyzed to the 3-ketone and, if desired, before or after ketal scission, the 17-hydroxyl group is esterified.

The acid radicals of the above-mentioned esters are preferably those of aliphatic, cycloaliphatic, araliphatic, aromatic or heterocyclic carboxylic acids containing 1 to 15 carbon atoms, being for example formates, acetates, propionates, butyrates, trimethylacetates, oenanthates, caproates, decanoates, cyclopentylpropionates, valerates, benzoates, furoates, hexahydrobenzoates, phenylpropionates, trifluoroacetates or the like. The alcohol radicals in the ethers are preferably those of lower aliphatic alkanols or monocyclic araliphatic alcohols or monocyclic heterocyclic alcohols, for example methanol, ethanol, propanol, benzyl alcohol, tetrahydropyranol or the like, and those in the ketals are advantageously derived from lower aliphatic dihydric alcohols, for example ethyleneglycol.

The following examples illustrate the invention.

Example 1

600 mg. of $\Delta^5$-3$\beta$:17$\beta$-diacetoxyandrostene-19-acid are heated in a 10 cc. distillation flask under about 100 mm. Hg pressure for 30 minutes at 240 to 250° C. and then distilled in a high vacuum. The resulting colorless oil is taken up in ether, freed from residues of starting material by being agitated with 2 N-sodium hydroxide solution and washed with water until the washings run neutral. The ethereal solution is dried and evaporated under vacuum, to yield 459 mg. of pure $\Delta^{5(10)}$-3$\beta$:17$\beta$-diacetoxy-19-norandrostene. The infra-red spectrum of the compound contains inter alia absorption bands at 5.80, 7.31, 8.15, 9.60 and 9.72$\mu$.

The starting material used above may be prepared as follows: A solution of 1.0 gram of the 6:19-lactone of 3$\beta$:17$\beta$ - diacetoxy - 5$\alpha$-chloro-6$\beta$-hydroxyandrostane-19-acid in 100 cc. of glacial acetic acid is heated to 100° C., 30 grams of zinc dust are vigorously stirred in portionwise, and the mixture is refluxed for 1 hour. The acetic acid solution is cooled, the excess zinc is filtered off, and washed with methylene chloride, and the combined filtrates are evaporated. The residue is taken up in methylene chloride, washed with dilute sulfuric acid and with water, and the solution is dried and evaporated, to yield 945 mg. of $\Delta^5$-3$\beta$:17$\beta$-diacetoxyandrostene-19-acid, which after one recrystallization from methylene chloride+ether, melts at 198–200° C.

Example 2

A solution of 330 mg. of $\Delta^{5(10)}$-3$\beta$:17$\beta$-diacetoxy-19-norandrostene in 20 cc. of methanol is mixed with a solution of 1.0 gram of potassium hydroxide in 5 cc. of water, and the whole is refluxed for 35 minutes. 20 cc. of water are then added and the methanol is evaporated under vacuum; the residue is taken up in ether+methylene chloride (4:1), washed with water until neutral, and the solution is dried and evaporated, to yield 260 mg. of $\Delta^{5(10)}$-3$\beta$:17$\beta$-dihydroxy-19-norandrostene which, after recrystallization from acetone or ethyl acetate, melts at 143–144° C. Optical rotation $[\alpha]_D^{25} = +107°$ (c.=1.0).

Example 3

A solution of 500 mg. of $\Delta^{5(10)}$-3$\beta$:17$\beta$-diacetoxy-19-norandrostene in 30 cc. of absolute tetrahydrofuran is added dropwise to a stirred suspension of 300 mg. of lithium aluminum hydride in 20 cc. of tetrahydrofuran. The reaction mixture is then stirred for 1 hour under reflux, cooled, the excess reagent is decomposed by carefully adding 1 cc. of ethyl acetate in 5 cc. of tetrahydrofuran, the complex is decomposed by adding 1 cc. of water in 5 cc. of tetrahydrofuran, and the precipitated inorganic material is filtered off. On evaporation of the solvent in vacuo there are obtained 398 mg. of pure $\Delta^{5(10)}$-3$\beta$:17$\beta$-dihydroxy-19-norandrostene melting at 142–144° C. which is identical with the compound described in Example 2.

Example 4

A solution of 90 mg. of $\Delta^{5(10)}$-3$\beta$:17$\beta$-dihydroxy-19-norandrostene in 2 cc. of acetone is mixed at 0° C. with 0.25 cc. of an 8 N-solution of chromium trioxide in sulfuric acid. The batch is stirred for another 15 minutes at 0° C., then poured into 20 cc. of water, extracted with a 4:1-mixture of ether and methylene chloride, the organic layer is washed with ice-cold saturated sodium bicarbonate solution and then with water, dried and evaporated under vacuum, to yield 56 mg. of $\Delta^{5(10)}$-3:17-dioxo-19-norandrostene melting at 128–134° C. Its infra-red spectrum contains absorption bands, inter alia, at 5.76, 5.85, 7.30, 9.28, 9.60 and 10.00μ. With authentic material it displays no depression of the mixed melting point.

Example 5

A solution of 42 mg. of $\Delta^{5(10)}$-3:17-dioxo-19-norandrostene in 1 cc. of glacial acetic acid is refluxed for 20 minutes. The solvent is then evaporated under vacuum and the residue is recrystallized from methylene chloride+ether, to yield 32 mg. of pure $\Delta^4$-3:17-dioxo-19-norandrostene (=19-norandrostenedione) melting at 162–164° C. The identical compound is also obtained by chromatography of the starting material on alumina (activity II, neutral).

Example 6

1.0 gram of $\Delta^5$-3-acetoxy-17-oxoandrostene-19-acid (melting at 250° C.) is heated for 45 minutes at 250° C. under 50 to 80 mm. Hg pressure. The brownish reaction product is taken up in ether, washed with saturated sodium bicarbonate solution and then with water until it is neutral, and the organic solution is dried and evaporated under vacuum. The slightly tinted crude product is dissolved in benzene and filtered through 20 times its own weight of alumina (activity II). Yield: 740 mg. of pure $\Delta^{5(10)}$-3-acetoxy-17-oxo-19-norandrostene [bands in the infra-red spectrum inter alia at 5.76, 5.80 (broad), 8.08, 9.77 and 10.20μ]. The product is dissolved in 100 cc. of absolute ether and added dropwise to a stirred, freshly prepared solution of methyl magnesium bromide in ether. The whole is then refluxed for 1 hour. Conventional working up yields 610 mg. of crude $\Delta^{5(10)}$-3$\beta$:17$\beta$-dihydroxy-17$\alpha$-methyl-19-norandrostene which is then dissolved, as it is, in 20 cc. of acetone and treated for 15 minutes at 0° C. with 1.1 cc. of 8 N-chromium trioxide solution in sulfuric acid. Subsequent chromatography of the resulting crude product on alumina yields 450 mg. of $\Delta^4$-3-oxo-17$\beta$-hydroxy-17$\alpha$-methyl-19-norandrostene which, after recrystallization from methylene chloride, melts at 155–156° C.

Example 7

A solution of 400 mg. of $\Delta^{5(10)}$-3$\beta$-acetoxy-17-oxo-19-norandrostene in 30 cc. of ether and 3 cc. of toluene is saturated at 0° C. with acetylene gas, and at −10° to 0° C. 10 cc. of a 2 N-solution of sodium tertiary amylate in tertiary amyl alcohol are then added dropwise within 20 minutes. A weak current of acetylene gas is then introduced for 15 hours at about 0° C. The batch is then poured into 40 cc. of an ammonium chloride solution of 20% strength, precooled to −5° C., and the batch is extracted with ether. The organic layer is washed with ice-cold ammonium chloride solution, dried and evaporated under vacuum, to yield 400 mg. of crude $\Delta^{5(10)}$-3$\beta$:17$\beta$-dihydroxy-17$\alpha$-ethinyl-19-norandrostene which displays in the infra-red spectrum bands inter alia at 2.78, 2.80, 3.00, 7.50 and 9.85μ.

The compound obtained in this manner is dissolved in 20 cc. of absolute toluene and mixed with 10 cc. of cyclohexanone and a solution of 750 mg. of aluminum isopropylate in 15cc. of toluene. 5 cc. of solvent are then distilled off and the reaction mixture is refluxed for 8 hours. Conventional working up furnishes a slightly tinted crude product which is dissolved in 10 cc. of acetone and treated at 5° C. for 45 minutes with 1 cc. of dilute hydrochloric acid. Dilution of the solution with benzene, washing it with sodium bicarbonate and then with water until the washings run neutral, drying and evaporation yields 310 mg. of crude $\Delta^4$-3-oxo-17$\beta$-hydroxy-17$\alpha$-ethinyl-19-norandrostene which after recrystallization displays a constant melting point of 200–202° C.

Example 8

When 1 gram of $\Delta^5$-3-acetoxy - 20 - oxo- or $\Delta^5$-3$\beta$:20-diacetoxypregnene-19-acid—accessible by oxidation of a corresponding 5$\alpha$-chloro-6$\beta$:19-oxido compound to form a 6:19-lactone of a 5$\alpha$-chloro-6$\beta$-hydroxy-19-acid and subsequent reduction, for example with zinc in glacial acetic acid—is treated as described in Example 1, there are obtained 610–650 mg. of $\Delta^{5(10)}$-3$\beta$-acetoxy-20-oxo- or $\Delta^{5(10)}$-3$\beta$:20-diacetoxy-19-norpregnene respectively. These compounds are converted into 19-norprogesterone (melting at 143–145° C.) by reduction with lithium aluminum hydride, followed by oxidation with chromium trioxide solution in sulfuric acid, and chromatography on alumina, the yield obtained amounting to about 60 to 65%.

What is claimed is:

1. Process for the manufacture of $\Delta^{5(10)}$-19-nor steroids wherein a member selected from the group consisting of a 3-unsubstituted $\Delta^5$-steroid-19-acid and a $\Delta^5$-3-acyloxy-steroid-19-acid is heated in the absence of an acid until carbon dioxide evolution ceases.

2. Process as claimed in claim 1, wherein heating is performed in a high boiling non-acidic solvent.

3. Process as claimed in claim 1, wherein heating is performed in a partial vacuum without using a solvent.

4. Process as claimed in claim 1, wherein $\Delta^5$-3:17-diacyloxy-androstene-19-acids are used as starting steroids.

5. Process as claimed in claim 1, wherein $\Delta^5$-3:20-diacyloxy-pregnene-19-acids are used as starting steroids.

6. Process as claimed in claim 1, wherein $\Delta^5$-3-acyloxy-17-oxo-androstene-19-acids are used as starting steroids.

7. Process as claimed in claim 1, wherein $\Delta^5$-3:17-diacyloxy-20-oxo-pregnene-19-acids are used as starting steroids.

8. Process for the manufacture of $\Delta^{5(10)}$-3,17$\beta$-dihydroxy-19-nor-androstenes, wherein a member selected from the group consisting of a $\Delta^5$-3-acyloxy-17-oxo androstene-19-acid and a $\Delta^5$-3:17$\beta$-diacyloxy-androstene-19-acid is heated in the absence of an acid until carbon dioxide evolution ceases and the resulting $\Delta^{5(10)}$-19-nor androstene is treated with a member selected from the group consisting of lithium aluminum hydride, sodium boronhydride and potassium boronhydride.

9. Process for the manufacture of $\Delta^4$-3-oxo-19-nor-androstenes, wherein a $\Delta^5$-3-acyloxy-17-oxo-androstene-19-acid is heated in the absence of an acid until carbon dioxide evolution ceases the resulting $\Delta^{5(10)}$-19-nor androstene compound is reacted with a compound of the formula M—X, in which M represents a member selected from the group consisting of MgCl, MgBr, MgI and an alkali metal and X represents a member selected from the group consisting of lower alkyl, lower alkenyl, lower alkynyl, lower haloalkenyl and lower haloalkynyl, in the so-obtained $\Delta^{5(10)}$-3-hydroxy-17$\beta$-hydroxy-17$\alpha$-X-19-nor-androstene the 3-hydroxyl group is oxidized to the oxo group and any resulting $\Delta^{5(10)}$-3-oxo-compound is treated with a member selected from the group consisting of an acid and a base.

10. Process for the preparation of a $\Delta^{5(10)}$-19-nor steroid which comprises subjecting the corresponding $\Delta^5$-3-acyloxy-19-acid steroid to thermal decarboxylation.

11. A member selected from the group consisting of $\Delta^{5(10)}$-3-hydroxy-17-oxo-19-nor-androstene and its esters derived from carboxylic acids having up to 15 carbon atoms.

12. $\Delta^{5(10)}$-3$\beta$-acetoxy-17-oxo-19-nor androstene.

13. A member selected from the group consisting of $\Delta^{5(10)}$-3-hydroxy-20-oxo-19-nor-pregnene and its esters derived from carboxylic acids having up to 15 carbon atoms.

14. $\Delta^{5(10)}$-3$\beta$-acetoxy-20-oxo-10-nor-pregnene.

References Cited

UNITED STATES PATENTS 2,573,418   10/1951   Ehrenstein _____ 260—397.1

OTHER REFERENCES

Hartman, J.A.C.S. 77, pp. 5151–54 (1955).
Iriarte et al.: J.A.C.S. 81, pp. 436–38 (1959).
Gardi et al.: Chem. Ital. 91, pp. 1420–30 (1961).

LEWIS GOTTS, *Primary Examiner.*

H. A. FRENCH, *Assistant Examiner.*